(12) United States Patent
Schober et al.

(10) Patent No.: US 12,244,427 B2
(45) Date of Patent: Mar. 4, 2025

(54) MULTI-STAGE SCHEDULING

(71) Applicant: Nokia Technologies Oy, Espoo (FI)

(72) Inventors: Karol Schober, Helsinki (FI); Kari Hooli, Oulu (FI); Esa Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 359 days.

(21) Appl. No.: 17/997,300

(22) PCT Filed: Apr. 15, 2021

(86) PCT No.: PCT/EP2021/059766
§ 371 (c)(1),
(2) Date: Oct. 27, 2022

(87) PCT Pub. No.: WO2021/228487
PCT Pub. Date: Nov. 18, 2021

(65) Prior Publication Data
US 2023/0171041 A1  Jun. 1, 2023

(30) Foreign Application Priority Data

May 14, 2020  (EP) .................................... 20174684

(51) Int. Cl.
*H04L 1/1829* (2023.01)
(52) U.S. Cl.
CPC .......... *H04L 1/1854* (2013.01); *H04L 1/1864* (2013.01)
(58) Field of Classification Search
CPC .... H04L 1/1854; H04L 1/1864; H04L 5/0053
(Continued)

(56) References Cited

U.S. PATENT DOCUMENTS 10,396,940 B1   8/2019  Nammi et al.
2011/0141928 A1  6/2011  Shin et al.
(Continued)

FOREIGN PATENT DOCUMENTS

CN   103024807 A   4/2013
CN   105391527 A   3/2016
(Continued)

OTHER PUBLICATIONS

Office Action received for corresponding Japanese Patent Application No. 2022-569006, dated Dec. 19, 2023, 4 pages of Office Action and 5 pages of summary and translation available.
(Continued)

*Primary Examiner* — Mang Hang Yeung
(74) *Attorney, Agent, or Firm* — Nokia Technologies Oy (57) ABSTRACT

An apparatus comprising means for: receiving, in a physical downlink control channel (PDCCH) in a first slot, first scheduling information for a data channel, wherein the first slot is separated by at least one first period of multiple slots from next first scheduling information; and receiving, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot points to at least the second scheduling information; and wherein the second scheduling information is related to at least one hybrid automatic request (HARQ) process for the data channel.

20 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0216713 | A1 | 9/2011 | Kim et al. |
| 2014/0211710 | A1* | 7/2014 | Guan .................... H04W 28/06 370/329 |
| 2018/0014298 | A1 | 1/2018 | Sun et al. |
| 2018/0103485 | A1 | 4/2018 | Jiang et al. |
| 2019/0045533 | A1 | 2/2019 | Chatterjee et al. |
| 2019/0181988 | A1* | 6/2019 | Gao ...................... H04L 1/1858 |
| 2020/0036483 | A1 | 1/2020 | Aijaz |
| 2020/0266937 | A1* | 8/2020 | Khoshnevisan ...... H04L 1/1896 |
| 2021/0352631 | A1* | 11/2021 | Fan ...................... H04B 7/0626 |
| 2022/0104185 | A1* | 3/2022 | Moon .................... H04L 1/1822 |

FOREIGN PATENT DOCUMENTS

| | | |
|---|---|---|
| CN | 109152004 A | 1/2019 |
| CN | 110121852 A | 8/2019 |
| CN | 110519021 A | 11/2019 |
| CN | 110892665 A | 3/2020 |
| CN | 111247825 A | 6/2020 |
| EP | 2747476 A1 | 6/2014 |
| WO | 2008/156414 A2 | 12/2008 |
| WO | 2009/131037 A1 | 10/2009 |
| WO | 2017/065666 A1 | 4/2017 |
| WO | 2018/060759 A1 | 4/2018 |
| WO | 2019/138499 A1 | 7/2019 |
| WO | 2019/222922 A1 | 11/2019 |
| WO | 2020/032743 A1 | 2/2020 |

OTHER PUBLICATIONS

"On multi-stage physical DL control", 3GPP TSG RAN1 WG Meeting #88, R1-1702224, Agenda item: 8.1.3.1.5, Intel Corporation, Feb. 13-18, 2017, pp. 1-2.

Office action received for corresponding Chinese Patent Application No. 202180034594.6, dated Mar. 28, 2024, 15 pages of office action and No. page of translation available.

"HARQ and scheduling enhancements for NR-U", 3GPP TSG-RAN WG1 Meeting #97, R1-1907456, Agenda item: 7.2.2.2.3, Ericsson, May 13-17, 2019, pp. 1-14.

"Remaining issues on NR-U HARQ scheduling and feedback", 3GPP TSG RAN WG1 #98bis, R1-1910596, Agenda item: 7.2.2.2.3, Nokia, Oct. 14-20, 2019, 16 pages.

Notice of Allowance received for corresponding Japanese Patent Application No. 2022-569006, dated May 28, 2024, 3 pages of Notice of Allowance and no page of translation available.

Office Action received for corresponding Indian Patent Application No. 202247071101, dated Apr. 21, 2023, 7 pages.

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.

"3rd Generation Partnership Project; Technical Specification Group Radio Access Network; NR; Physical channels and modulation (Release 16)", 3GPP TS 38.211, V16.0.0, Dec. 2019, pp. 1-129.

"Offline Discussion on on Two-Stage DCI", 3GPP TSG-RAN WG1 #88, R1-1703863, Agenda: 8.1.3.1.5, Ericsson, Feb. 13-17, 2017, pp. 1-2.

"Mechanisms for efficient operation for MUST", 3GPP TSG RAN WG1 #85, R1-164436, Agenda: 6.2.4.2, Qualcomm Incorporated, May 23-27, 2016, pp. 1-4.

Extended European Search Report received for corresponding European Patent Application No. 20174684.9, dated Oct. 28, 2020, 8 pages.

International Search Report and Written Opinion received for corresponding Patent Cooperation Treaty Application No. PCT/EP2021/059766, dated Jun. 17, 2021, 10 pages.

Office action received for corresponding Chinese Patent Application No. 202080101604.9, dated Apr. 26, 2024, 9 pages of office action and no page of translation available.

* cited by examiner

MULTI-STAGE SCHEDULING

RELATED APPLICATION

This application was originally filed as PCT Application No. PCT/EP2021/059766 on Apr. 15, 2021, which claims priority to EP Application Serial No. 20174684.9, filed on May 14, 2020, each of which is incorporated herein by reference in its entirety.

TECHNOLOGICAL FIELD

Embodiments of the present disclosure relate to multi-stage scheduling. Some relate to use of PDCCH for configuring Hybrid Automatic Repeat Request (HARQ).

BACKGROUND

HARQ is a stop and wait process that stops and waits for an acknowledgement, so an increase in processing delay increases the wait and the round trip delay. Therefore, multiple parallel/overlapping in time HARQ processes are used. Larger round trip delays require an increased number of HARQ processes. HARQ process starvation occurs when there are insufficient HARQ processes compared to HARQ-ACK timeline of a given scenario.

BRIEF SUMMARY

According to various, but not necessarily all, embodiments there is provided an apparatus comprising means for:
receiving, in a physical downlink control channel (PDCCH) in a first slot, first scheduling information for a data channel, wherein the first slot is separated by at least one first period of multiple slots from next first scheduling information; and receiving, in the PDCCH in at least one second slot, second scheduling information for the data channel, wherein the at least one second slot is delayed with respect to the first slot by one or more slots and is received within the first period of multiple slots after the first slot,
wherein the first scheduling information in the first slot points to at least the second scheduling information; and
wherein the second scheduling information is related to at least one hybrid automatic request (HARQ) process for the data channel.

In some but not necessarily all examples, the first scheduling information points, in frequency and/or time, to at least the second scheduling information.

In some but not necessarily all examples, at least one of the first scheduling information and the second scheduling information is configured to enable at least two HARQ processes for the data channel, wherein the two HARQ processes are non-overlapping in the time domain.

In some but not necessarily all examples, the first scheduling information and the second scheduling information in combination enable:
receiving first data in a slot of the data channel during the at least one first period;
receiving second data in a different slot of the data channel during the at least one first period; and
transmitting a HARQ reply for the first data separately to transmitting a HARQ reply for the second data.

In some but not necessarily all examples, the first scheduling information and the second scheduling information in combination enable:
transmitting first data in a slot of the data channel during the at least one first period; and
transmitting second data in a different slot of the data channel during the at least one first period.

In some but not necessarily all examples, the first scheduling information is configured to allocate one or more early HARQ processes before reception of second scheduling information and wherein the second scheduling information is configured to assist allocation of one or more later HARQ processes after reception of the second scheduling information.

In some but not necessarily all examples, the reception in the PDCCH is with a subcarrier spacing of 480 kHz, 960 kHz, 1920 kHz or greater.

In some but not necessarily all examples, the apparatus is configurable, in response to received control signaling, to enable remote control of one or more of:
the at least one first period duration;
a content of the first scheduling information;
a pointer in frequency and/or time, to at least the second scheduling information;
a timing of the first slots comprising first scheduling information;
a number of second slots, within the first period, comprising second scheduling information;
a content of second scheduling information;
a timing of second slots comprising second scheduling information timing of HARQ replies;
enabling early HARQ processes before reception of second scheduling information.

In some but not necessarily all examples, the apparatus is configured as user equipment or mobile equipment of a radio access network.

According to various, but not necessarily all, embodiments there is provided a computer program that, when run on a computer comprised in user equipment, enables the user equipment to perform:
receiving, in a physical downlink control channel (PDCCH) in a first slot, first scheduling information for a data channel, wherein the first slot is separated by at least one first period of multiple slots from next first scheduling information;
receiving, in the PDCCH in at least one second slot, second scheduling information for the data channel, wherein the at least one second slot is delayed with respect to the first slot by one or more slots and is received within the first period of multiple slots after the first slot,
wherein the first scheduling information in the first slot points to at least the second scheduling information; and
wherein the second scheduling information is related to at least one hybrid automatic request (HARQ) process for the data channel.

According to various, but not necessarily all, embodiments there is provided a method comprising:
transferring, in a physical downlink control channel (PDCCH) in a first slot, first scheduling information for a data channel, wherein the first slot is separated by at least one first period of multiple slots from next first scheduling information; and
transferring, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot points to at least the second scheduling information; and wherein the second scheduling information is related to at least one hybrid automatic request (HARQ) process for the data channel.

According to various, but not necessarily all, embodiments there is provided a system comprising means for:

transmitting, in a physical downlink control channel (PDCCH) in a first slot, first scheduling information for a data channel, wherein the first slot is separated by at least one first period of multiple slots from next first scheduling information; and transmitting, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot points to at least the second scheduling information; and wherein the second scheduling information is related to at least one hybrid automatic request (HARQ) process for the data channel.

In some but not necessarily all examples, the system is configured to control one or more of:

the at least one first period duration;

a content of the first scheduling information;

the pointer in frequency and/or time, to at least the second scheduling information;

a timing of the first slots comprising first scheduling information;

a number of second slots, within the first period, comprising second scheduling information;

a content of second scheduling information;

a timing of second slots comprising second scheduling information timing of HARQ replies;

enabling early HARQ processes before reception of second scheduling information.

In some but not necessarily all examples, the second scheduling information is based on information that was not available at the time of transmitting the first scheduling information.

In some but not necessarily all examples, the system is configured as a base station for a radio access network.

According to various, but not necessarily all, embodiments there is provided a computer program that, when run on a computer comprised in a base station, enables the base station to perform:

transmitting, in a physical downlink control channel (PDCCH) in a first slot, first scheduling information for a data channel, wherein the first slot is separated by at least one first period of multiple slots from next first scheduling information; and transmitting, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot points to at least the second scheduling information; and wherein the second scheduling information is related to at least one hybrid automatic request (HARQ) process for the data channel.

According to various, but not necessarily all, embodiments there is provided an apparatus comprising means for:

receiving, in a physical downlink control channel (PDCCH) in a first slot, first scheduling information for a data channel, wherein the first slot is separated by at least one first period of multiple slots from next first scheduling information; and receiving, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot provides a pointer, in frequency and/or time, to at least the second scheduling information; and wherein the second scheduling information is related to at least one hybrid automatic request (HARQ) process for the data channel.

According to various, but not necessarily all, embodiments there is provided a computer program that, when run on a computer comprised in user equipment, enables the user equipment to perform:

receiving, in a physical downlink control channel (PDCCH) in a first slot, first scheduling information for a data channel, wherein the first slot is separated by at least one first period of multiple slots from next first scheduling information;

receiving, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot provides a pointer, in frequency and/or time, to at least the second scheduling information; and wherein the second scheduling information is related to at least one hybrid automatic request (HARQ) process for the data channel.

According to various, but not necessarily all, embodiments there is provided a system comprising means for:

transmitting, in a physical downlink control channel (PDCCH) in a first slot, first scheduling information for a data channel, wherein the first slot is separated by at least one first period of multiple slots from next first scheduling information; and transmitting, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot provides a pointer, in frequency and/or time, to at least the second scheduling information; and wherein the second scheduling information is related to at least one hybrid automatic request (HARQ) process for the data channel.

According to various, but not necessarily all, embodiments there is provided a computer program that, when run on a computer comprised in a base station, enables the base station to perform:

transmitting, in a physical downlink control channel (PDCCH) in a first slot, first scheduling information for a data channel, wherein the first slot is separated by at least one first period of multiple slots from next first scheduling information; and transmitting, in the PDCCH in at least one second slot, second scheduling information for the data channel, wherein the at least one second slot is delayed with respect to the first slot by one or more slots and is received within the first period of multiple slots after the first slot, wherein the first scheduling information in the first slot provides a pointer, in frequency and/or time, to at least the second scheduling information; and wherein the second scheduling information is related to at least one hybrid automatic request (HARQ) process for the data channel.

According to various, but not necessarily all, embodiments there is provided examples as claimed in the appended claims.

There is presented a novel way of using PDCCH for configuring HARQ.

BRIEF DESCRIPTION

Some examples will now be described with reference to the accompanying drawings in which.

DETAILED DESCRIPTION

Figure 1:
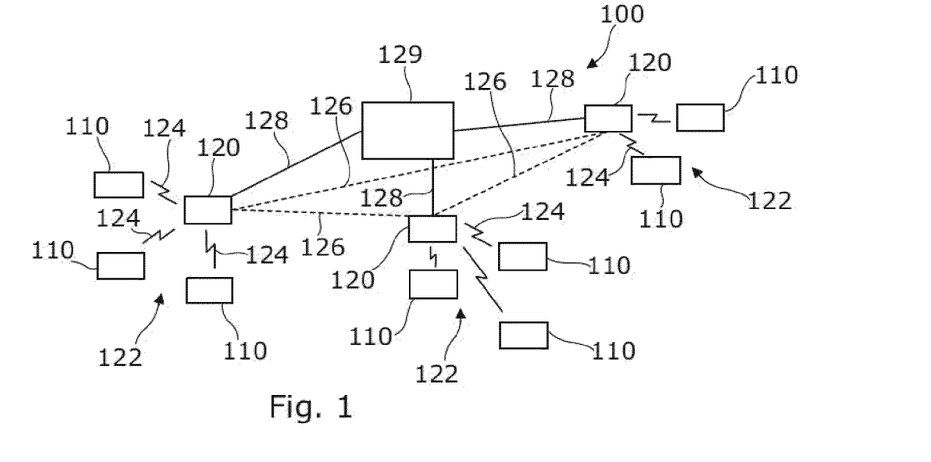
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated, the cellular network 100 is a third generation Partnership Project (3GPP) network in which the terminal nodes 110 are user equipment (UE) and the access nodes 120 are base stations.

In the particular example illustrated, the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example, the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

Each terminal node 110 is typically an apparatus, for example mobile equipment. In another example, terminal node 110 is a functionality of the relay node facilitating backhaul (a.k.a. parent link), such as mobile termination part of the integrated access and backhaul (IAB) node. The mobile equipment can have a storage/warehoused configuration and a for-use configuration. The for-use configuration enables use, but is not necessarily in use. This for-use configuration can for example include inserting a smart card such as a suitable a subscriber identity module (SIM) into the apparatus. The mobile equipment, when in the for-use configuration can be described as user equipment.

Each access node 120 (base station) is typically a system comprising a number of interconnected components. In some examples, the base station architecture can be split between a remote centralized unit and a distributed unit. In another example, access node 120 is a functionality of the relay node facilitating access link (a.k.a. child link(s)), such as distributed unit part of the IAB node.

In the following there is described an apparatus 110 comprising means for:

receiving, in a physical downlink control channel (PDCCH) in a first slot, first scheduling information 20_1 for a data channel, wherein the first slot is separated by at least one first period of multiple slots from next first scheduling information 20_1; and receiving, in the PDCCH in at least one second slot, second scheduling information 20_2 for the data channel, wherein the at least one second slot is delayed with respect to the first slot by one or more slots and is received within the first period of multiple slots after the first slot, wherein the first scheduling information 20_1 in the first slot is associated with (e.g. points to) at least the second scheduling information 20_2; and wherein the second scheduling information 20_2 is related to at least one hybrid automatic request (HARQ) process for the data channel.

There is also described a system comprising means for:

transmitting, in a physical downlink control channel (PDCCH) in a first slot, first scheduling information 20_1 for a data channel, wherein the first slot is separated by at least one first period of multiple slots from next first scheduling information 20_1; and transmitting, in the PDCCH in at least one second slot, second scheduling information 20_2 for the data channel, wherein the at least one second slot is delayed with respect to the first slot by one or more slots and is received within the first period of multiple slots after the first slot, wherein the first scheduling information 20_1 in the first slot is associated with (e.g. points to) at least the second scheduling information 20_2; and wherein the second scheduling information 20_2 is related to at least one hybrid automatic request (HARQ) process for the data channel.

Figure 2:
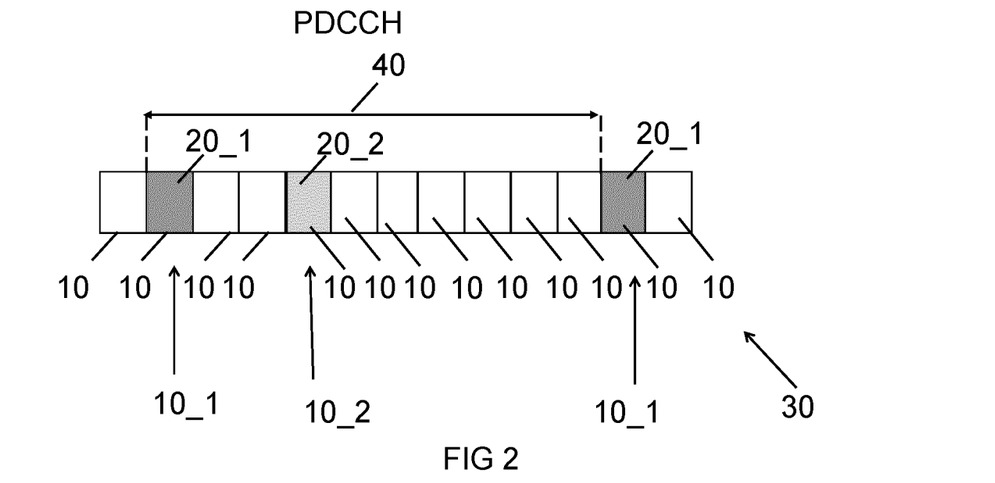
FIG. 2 shows another example of the subject matter described herein.

FIG. 2 illustrates a scheduling operation involving physical downlink control channel (PDCCH) 30.

The physical downlink control channel 30 is used to transfer control information in the downlink direction from base station 120 to user equipment 110. The channel exists at the physical layer within slots 10.

First slots 10_1 with the PDCCH 30 are separated from each other by at least one first period 40 of multiple slots 10.

First scheduling information 20_1 for a data channel (not illustrated in FIG. 2) is in the first slots 10_1. Different first slots 10_1 can comprise different first scheduling information 20_1. For example, an initial first slot 10_1 comprises initial first scheduling information 20_1 and a following first slot 10_1 comprises next first scheduling information 20_1.

The (initial) first slot 10_1 is separated by at least one first period 40 of multiple slots 10 from the next first scheduling information 20_1.

Second scheduling information 20_2 for the data channel (not illustrated in FIG. 2) is in one or more second slots 10_2. The one or more second slots 10_2 are associated with a preceding first slot 10_1.

The one or more second slots 10_2 is delayed with respect to the associated first slot 10_1 by one or more slots 10 and is received within the first period 40 of multiple slots 10 after the associated first slot 10_1.

The first scheduling information 20_1 in the first slot 10_1 is associated with (e.g. points to) at least the second scheduling information 20_2 in the associated second slot 10_2. In some examples, the first scheduling information 20_1 points, in frequency and/or time, to at least the second scheduling information 20_2.

The second scheduling information 20_2 is related to at least one hybrid automatic request (HARQ) process for the data channel.

The base station 120 transmits the first scheduling information 20_1 in the first slots 10_1 and transmits the second scheduling information 20_2 in one or more second slots 10_2.

The user equipment 110 receives the first scheduling information 20_1 in the first slots 10_1 and receives the second scheduling information 20_2 in one or more second slots 10_2.

HARQ is a stop and wait process that stops and waits for an acknowledgement. The effect of the round trip delay is mitigated to some extent by using multiple HARQ processes that are in parallel and sequential (staggered). However, larger round trip delays require an increased number of HARQ processes and this is not necessarily possible or desirable. As a consequence, HARQ process starvation can occur when there are insufficient HARQ processes for the round trip delay. The round trip delay (measured in slots) increases typically as slot size decreases. For example, UE/gNB processing times (measured in slots) increase typically as the slot size decreases.

In FIG. 2, HARQ starvation is further mitigated by using the second scheduling information 20_2 to allocate one or more HARQ processes for the data channel. This allocation is delayed relative to a HARQ process allocation in response to the first scheduling information 20_1 (if any) and can mitigate HARQ starvation.

In some but not necessarily all examples, the number of available HARQ processes is limited to a maximum of 16.

The scheduling information provides control information from the base station 120 to the user equipment 110 that is used for data transfer via the data channel with HARQ.

The control information can, for example, comprise information for resource allocation for a data channel (frequency domain resource allocation and/or time domain resource allocation), information for decode assistance, and HARQ parameters.

The information for decode assistance of a transport block (TB) can for example comprise modulation and coding scheme (MCS) and redundancy version (RV) which defines a puncturing pattern after channel coding.

The HARQ parameters comprise: HARQ process number and a new data indicator (NDI). For downlink data transfer, the HARQ parameters can additionally comprise parameters for HARQ reply/feedback e.g. reply timing and/or PUCCH resource indicator.

The second scheduling information 20_2 can, for example, comprise information that was not available at a time of transferring the first scheduling information 20_1. This 'unavailable' information can, for example, comprise one or more of: information for resource allocation for the data channel (frequency domain resource allocation and/or time domain resource allocation), decode assistance information, and HARQ parameters. The second scheduling information 20_2 optionally comprises information that is common to (shared by) the first scheduling information 20_1 and the second scheduling information 20_2.

At least some of the scheduling information required for data transfer may be delayed and provided in the second scheduling information 20_2 and not in the first scheduling information 20_1. The second scheduling information 20_2 therefore comprises scheduling information (original scheduling information) that is not present in or is inapplicable to the first scheduling information 20_1.

From the user equipment point of view, "data transfer" can cover reception (downlink) or transmission (uplink), for example it can cover at least one of PDSCH reception and PUSCH transmission The original scheduling information can be related to at least one hybrid automatic request (HARQ) process for the data channel.

The original scheduling information can for example be any suitable control information that may be used for a HARQ process. For example, the original scheduling information can comprise one or more of: resource allocation for a data channel, decode assistance information, and one or more HARQ parameters.

This original scheduling information can for example be one or more HARQ parameters, for example, a HARQ process number and/or a new data indicator (NDI). For downlink data transfer, the original scheduling information can for example be a HARQ parameter for HARQ reply e.g. reply timing and/or PUCCH resource indicator. The original second scheduling information 20_2 can therefore cause allocation of an original HARQ process, that is, one that has not been allocated by associated preceding first scheduling information 20_1 (or associated preceding second scheduling information 20_2).

The splitting of scheduling information between the first scheduling information 20_1 and the one or more second scheduling information 20_2 can be controlled via control plane signaling from the base station e.g. radio resource control (RRC) signaling.

The scheduling information can be related to at least two time-separated hybrid automatic request (HARQ) processes for time-separated data transfers in the data channel.

In some examples, the first scheduling information 20_1 and the second scheduling information 20_2 are configured to enable at least two HARQ processes for the data channel, where the two HARQ processes are non-overlapping in the time domain.

The first scheduling information 20_1 and the second scheduling information 20_2 in combination enable:
transfer of first data in a slot of the data channel during the at least one first period;
transfer of second data in a different slot of the data channel during the at least one first period.

In some examples, the first scheduling information 20_1 and the second scheduling information 20_2 in combination enable:
transfer of a HARQ reply for the first data separately to receiving a HARQ reply for the second data.

The data channel can, for example, be a physical shared channel. For example a physical downlink shared channel (PDSCH) or a physical uplink shared channel (PUSCH). The HARQ reply channel, used for sending an acknowledgement of successful data transfer, the HARQ reply, can, for example, be a physical channel, physical control channel (PUCCH), or a PUSCH with HARQ reply multiplexed with UL data or other UL control information.

The second scheduling information for the data channel can enable a HARQ reply for second data.

In one example, the first scheduling information 20_1 can cause allocation of a HARQ process for an earlier data transfer (e.g. first data) and the second scheduling information 20_2 can cause allocation of a different HARQ process for a later data transfer (e.g. second data). In this example, allocation of the different HARQ process for the later data transfer may, or may not, also require at least some of the first scheduling information 20_1. In this example, the first scheduling information 20_1 is sufficient for allocation of the HARQ process for the earlier data transfer. In this example, the second scheduling information 20_2 is sufficient for allocation of the HARQ process for the later data transfer. In some examples, the second scheduling information 20_2 is sufficient for allocation of the HARQ process for the later data transfer. In other examples, the first scheduling information 20_1 and the second scheduling information 20_2 are, in combination, sufficient for allocation of the HARQ process for the later data transfer. The first scheduling information 20_1 can, in this way, assist allocation of a HARQ process for data transfer.

In a further example, the first scheduling information 20_1 does not cause allocation of a HARQ process for an earlier data transfer. However, earlier second scheduling information 20_2 can cause allocation of a HARQ process for an earlier data transfer (e.g. first data) and later second scheduling information 20_2 can cause allocation of a different HARQ process for a later data transfer (e.g. second data). In this example, allocation of the HARQ processes for the earlier and later data transfer may also require at least some of the first scheduling information 20_1. The first scheduling information 20_1 assists allocation of a HARQ processes for data transfer. In this example, the first scheduling information 20_1 is sufficient for allocation of the HARQ process for the earlier data transfer. In this example, the second scheduling information 20_2 is sufficient for allocation of the HARQ process for the later data transfer. In some examples, the second scheduling information 20_2 is sufficient for allocation of the HARQ process for the later data transfer, and in other examples, the first scheduling information 20_1 and the second scheduling information 20_2 are, in combination, sufficient for allocation of the HARQ process for the later data transfer.

It will therefore be appreciated that in some examples, the first scheduling information 20_1 causes allocation of one or more HARQ processes for one or more data transfers and/or assists allocation of one or more HARQ process for one or more data transfers.

It will therefore be appreciated that in some examples, the second scheduling information 20_2 causes allocation of one or more HARQ processes for one or more data transfers.

The HARQ feedback for data transfer in the data channel is split into multiple HARQ replies for smaller data transfers.

In some examples, the first scheduling information 20_1 enables data transfer with HARQ for earlier scheduled data transfers, and the second scheduling information 20_2 enables data transfer with HARQ for later scheduled data transfers.

In some examples, the first scheduling information 20_1 is configured to allocate one or more early HARQ processes before reception of second scheduling information 20_2, and the second scheduling information 20_2 is configured to assist allocation of one or more HARQ processes enabled by the second scheduling information 20_2. The one or more HARQ processes enabled by the second scheduling information 20_2 are after and/or simultaneously with the reception of the second scheduling information 20_2.

Data scheduling in the data channel can be controlled by the scheduling information in both uplink and downlink.

The scheduling information can comprise information for resource allocation for the data channel (frequency domain resource and/or time domain resource). This scheduling information can be wholly or partly in the first scheduling information 20_1. This scheduling information can be wholly or partly in the second scheduling information 20_2.

Thus the scheduling of transfer of data in a slot of the data channel can be controlled by the first scheduling information 20_1 either directly using the first scheduling information 20_1 or indirectly using the second scheduling information 20_2.

For example, the first scheduling information 20_1 can schedule the slots used for an initial data transfer or the second scheduling information 20_2 can schedule the slots used for initial data transfer.

The second scheduling information 20_2 occurs between periodic slots 10_1 that can be used for transmission of first scheduling information 20_1. The second scheduling information 20_2 provides delayed delivery for a part of control information relevant for HARQ for data channel. The delay can, for example, be 4, 8, 16 slots.

The second scheduling information 20_2 can have a specific PDCCH (sub-space) monitoring operation depending on blind detected first scheduling information 20_1 e.g. a candidate location The first scheduling information 20_1 can indicate whether the second scheduling information 20_2 is present or not.

In some examples, an empty second slot (without second scheduling information 20_2) can be used to convey information to the UE, for example cancelling a downlink data transfer.

The PDCCH 30 can have a variable subcarrier spacing controlled by the network. The subcarrier spacing can for example be 480 kHz, 960 kHz, 1920 kHz or greater. A larger subcarrier spacing provides a larger bandwidth for the same FFT size and increases bandwidth part (BWP) and physical resource block (PRB) size in the frequency domain, but decreases a duration of a slot and a duration of a symbol.

In some but not necessarily all examples, the frequency of operation of the modulated carrier wave used for the PDCCH 30 can have a frequency above 52.6 GHz for example between 52.6 GHz and 71 GHz. It is also possible to use these solutions in other frequency bands.

The period 40 can have a duration of $2^n$ slots.

A first slot 10_1 comprising first information 20_1 can be separated from a following first slot 10_1 comprising first information by a scheduling unit of one or more periods 40.

The period 40 can, for example, be static (set by a standard), or semi-static (set by a higher layer e.g. control plane signaling such as RRC signaling).

The first scheduling information 20_1 can have added functionalities compared to the second scheduling information 20_2.

In at least some examples, the first scheduling information 20_1 facilitates/assists reception of the second scheduling information 20_2.

In at least some examples, the first scheduling information 20_1 is, for example, blind detected/decoded once per scheduling unit corresponding to period 40 and the reception of the first scheduling information 20_1 assists blind detection/decoding of one or more second scheduling information 20_2 per scheduling unit or period 40.

The assistance provided by the first scheduling information 20_1 can be that the resource for the second scheduling information 20_2 has a relationship relative to the resource used to detect/decode the first scheduling information 20_1. The relationship can, for example, be an expected relationship that is implicitly defined e.g. statically (by a standard) or semi-statically (by higher layer control plane signaling such as RRC signaling). The relationship can, for example, be an explicitly defined relationship that is potentially variable and communicated by some variability of the first scheduling information 20_1 (e.g. variable content, and/or variability of its position in time-frequency space).

It will therefore be appreciated that there is an association between the first slots and the second slots and between the first scheduling information 20_1 and the second scheduling information 20_2. This association can, in some examples, be used to facilitate/assist reception of the second scheduling information 20_2. The association can be: (i) indicated by the first scheduling information 20_1, (ii) preconfigured by higher layer signaling, and/or (iii) specified by a specification.

There is an association from the first scheduling information 20_1 in the first slot 10_1 to the second scheduling information 20_2. The first scheduling information 20_1 can, for example, be associated to (e.g. points to) the second scheduling information 20_2 because, at the time of receiving the second scheduling information 20_2, the user equipment 110 has knowledge that facilitates/assists reception of the second scheduling information 20_2. The knowledge can, for example, be knowledge of a relationship in time and/or frequency between the first scheduling information 20_1 (and/or first slot comprising the first scheduling information 20_1) and the second scheduling information 20_2 (and/or second slot comprising the second scheduling information 20_2). The relationship can for example be an offset in the domain time and/or an offset in the frequency domain from time-frequency resources used to receive the first scheduling information 20_1 (and/or the first slot comprising the first scheduling information 20_1) and the time-frequency resources to be used to receive second scheduling information 20_2 (and/or a second slot comprising the second scheduling information 20_2). The UE may not try/be able to detect the second scheduling information 20_2 provided that it has not received the first scheduling information 20_1.

The assistance provided by the first scheduling information 20_1 is dependent upon at least a recognition of the decoded/detected information as first scheduling information 20_1. Thus, in at least some examples, the first scheduling information 20_1 provides a pointer, in frequency and/or time, to at least the second scheduling information 20_2. That is, unless the first scheduling information 20_1 is received, the second scheduling information 20_2 cannot be or cannot easily be found. However, reception of the first scheduling information 20_1 assists reception of (points to, provides a pointer to, and/or provides some other indication to) the second scheduling information 20_2.

In some variants, the pointer may be implicit e.g. hard-coded in a specification or RRC configured. In other variants, the pointer may be variable and indicated by the first scheduling information 20_1. For example, a position of the first scheduling information 20_1 within a time slot can be used to define the pointer. For example, a position of the first scheduling information 20_1 within a frequency domain can be used to define the pointer. For example, content can be comprised within the first scheduling information 20_1 that defines, indicates, or codes the pointer.

The first scheduling information 20_1 can, for example, provide for selection of a predefined pattern (from a plurality of patterns, for example, configured by RRC signaling) or provide a bitmap (or code to identify a bitmap) covering the number/timing of second slots for second scheduling information 20_2 transfer. The bitmap, if included within the first scheduling information 20_1 can be of a fixed length, but variable content. The number of second slots 10_2 as well as timing between the first slot 10_1 and second slot(s) 10_2 and the timing between second slots 10_2 can be dynamically varied by indicating a different bitmap from the set of bitmaps configured by RRC signaling.

The pointer may be, for example, be a time offset relative to the first slot, or the first scheduling information 20_1. In some examples, the second scheduling information 20_2 in the second slot can be detected based on a configuration of resources used for the first scheduling information 20_1 in the first slot. For example, the location of second scheduling information 20_2 in time can be determined based on which location (of many predefined locations) the first scheduling information 20_1 has within the first slot and/or the location of second scheduling information 20_2 in frequency is determined based on the location of first scheduling information 20_1 in frequency.

Pointing or providing a pointer, in frequency and/or time, to at least the second scheduling information 20_2 means providing sufficient information, via reception of the first scheduling information 20_1, that may be required to obtain the second scheduling information 20_2. The information can be conveyed in any suitable manner.

The pointer can, for example, provide a constraint for a constrained search in frequency and/or time e.g. assist blind detection. The pointer could directly provide the constraint (e.g. defining or indicating it using the scheduling information) or could indirectly provide the constraint (e.g. providing coded information for accessing or reproducing the constraint). The pointer can, for example, provide a single candidate location of the second scheduling information 20_2 in the search space (time and frequency), for example, it defines a searchable sub-space of the search space. In an example, the same PDCCH candidate (exact set of control channel elements (CCEs) or the candidate with the same index) carrying first scheduling information 20_1 in first slot can be used to convey second scheduling information 20_2 in the second slot.

The first scheduling information 20_1 can, in some examples, provide a pointer to all the occurrences of second scheduling information 20_2 within the scheduling unit. There can be one occurrence or more than one occurrence.

In at least some examples, the pointer is a functionality that the first scheduling information 20_1 has, which the second scheduling information 20_2 does not have. The second scheduling information 20_2 does not provide a pointer to one or more following second scheduling information 20_2.

Figure 3:
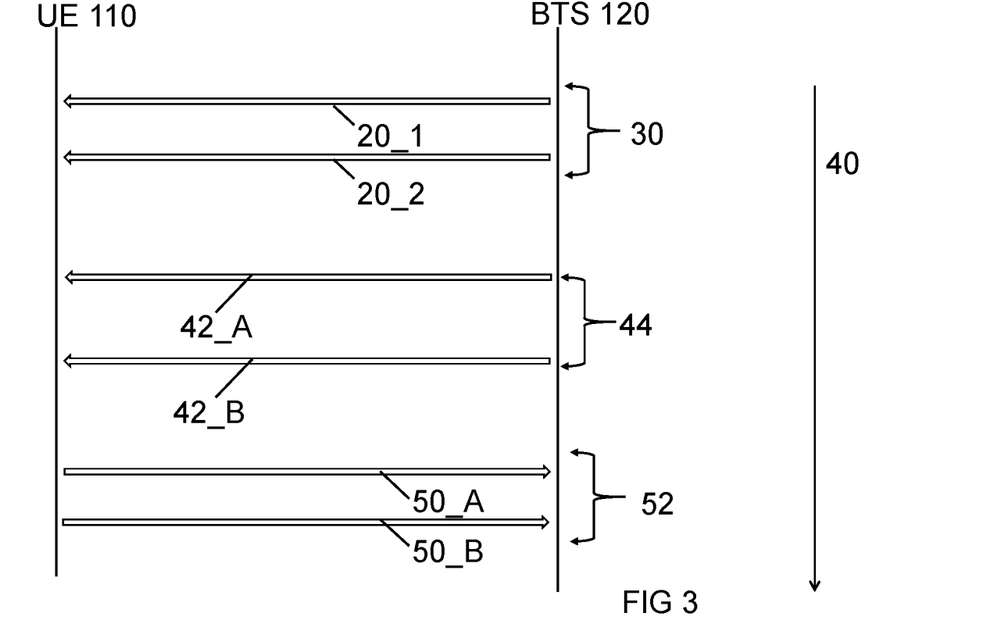
FIG. 3 shows another example of the subject matter described herein.

FIG. 3 illustrates an example of a scheduled data transfer via a downlink data channel 44 with HARQ.

The PDCCH 30 is used to transfer, from the base station 120 to the UE 110, first scheduling information 20_1 in a first slot and second scheduling information 20_2 in a second slot.

The ordering of the messages varies depending on the scenario. For example, in a DL scenario.

The first scheduling information 20_1 and the second scheduling information 20_2 can be as described previously. The scheduling information can be split between the first and second scheduling information 20_1, 20_2 as previously described. The scheduling information can, for example, comprise one or more of: resource allocation for the data channel (frequency domain resource allocation and/or time domain resource allocation), information for decode assistance, and HARQ parameters.

The base station 120 transmits, and the UE 110 receives, first data in a slot 42_A of the data channel 44 during the one or more periods of a scheduling unit 40.

The base station 120 transmits, and the UE 110 receives, second data in a slot 42_B of the data channel 44 during the one or more periods of a scheduling unit 40.

The UE 110 transmits, and the base station 120 receives a HARQ reply 50_A for the first data.

The UE 110 transmits, and the base station 120 receives a HARQ reply 50_B for the second data. The HARQ reply 50_B for the second data is transmitted separately to the HARQ reply 50_A for the first data.

The data channel 44 is a physical downlink shared channel (PDSCH).

The channel 52 used for the separate HARQ replies 50_A, 50_B is a physical uplink channel, for example, the physical uplink control channel (PUCCH) or the physical uplink shared channel (PUSCH).

In some examples, HARQ replies can be combined. For example, HARQ reply 50_A may be combined to the transmission of HARQ reply 50_B.

Figure 4:
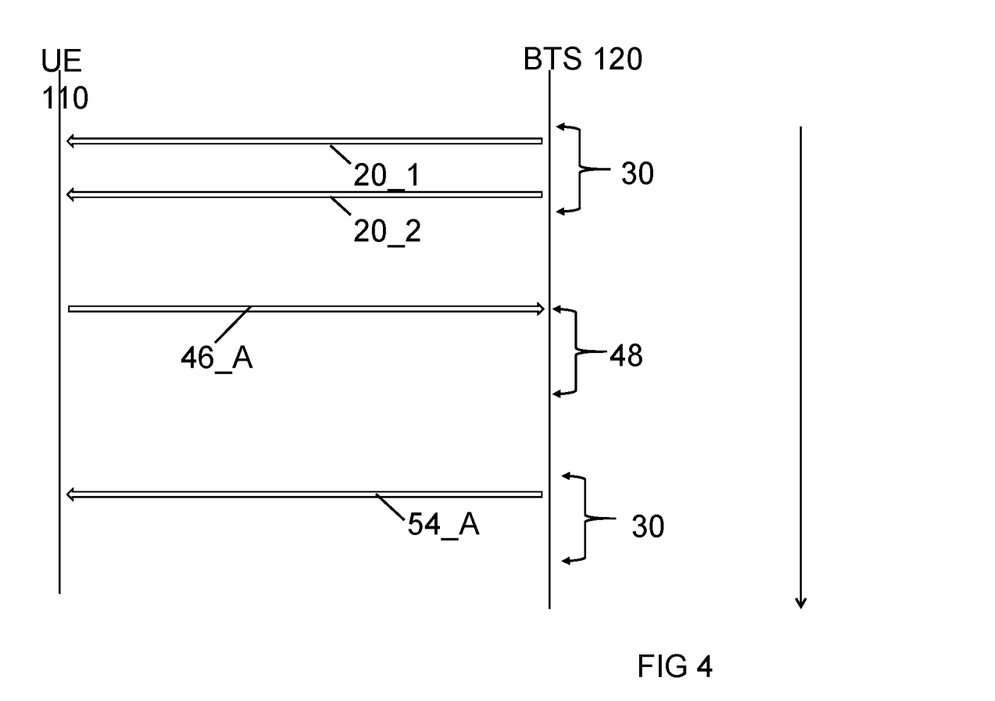
FIG. 4 shows another example of the subject matter described herein.

FIG. 4 illustrates an example of a scheduled data transfer via an uplink data channel 48 with HARQ.

The PDCCH 30 is used to transfer, from the base station 120 to the UE 110, first scheduling information 20_1 in a first slot and second scheduling information 20_2 in a second slot.

The first scheduling information 20_1 and the second scheduling information 20_2 can be as described previously. The scheduling information can be split between the first and second scheduling information 20_1, 20_2 as previously described. The scheduling information can, for example, comprise one or more of: resource allocation for the data channel (frequency domain resource allocation and/or time domain resource allocation), information for decode assistance, and HARQ parameters.

The base station 120 transmits, and the UE 110 receives, first data in a slot 46_A of the data channel 48 during the one or more periods of a scheduling unit 40.

The UE 110 transmits, and the base station 120 receives a HARQ reply 54_A for the first data.

The data channel 48 is a physical uplink shared channel (PUSCH)

The channel 54 used for the HARQ reply 54_A is the physical downlink control channel 30.

FIGS. 2, 3 and 4 illustrate a method, at a user equipment 110, comprising:
- receiving, in a physical downlink control channel (PDCCH) in a first slot, first scheduling information 20_1 for a data channel, wherein the first slot is separated by at least one first period of multiple slots from next first scheduling information 20_1; and
- receiving, in the PDCCH in at least one second slot, second scheduling information 20_2 for the data channel, wherein the at least one second slot is delayed with respect to the first slot by one or more slots and is received within the first period of multiple slots after the first slot,
- wherein the first scheduling information 20_1 in the first slot is associated with (e.g. points to) at least the second scheduling information 20_2; and wherein the second scheduling information 20_2 is related to at least one hybrid automatic request (HARQ) process for the data channel.

FIGS. 2, 3 and 4 illustrate an equivalent method, at a base station 120, comprising:
- transmitting, in a physical downlink control channel (PDCCH) in a first slot, first scheduling information 20_1 for a data channel, wherein the first slot is separated by at least one first period of multiple slots from next first scheduling information 20_1; and
- transmitting, in the PDCCH in at least one second slot, second scheduling information 20_2 for the data channel, wherein the at least one second slot is delayed with respect to the first slot by one or more slots and is received within the first period of multiple slots after the first slot,
- wherein the first scheduling information 20_1 in the first slot is associated with (e.g. points to) at least the second scheduling information 20_2; and wherein the second scheduling information 20_2 is related to at least one hybrid automatic request (HARQ) process for the data channel.

It will be appreciated from the foregoing the base station 120 is a system comprising means for:
- transmitting, in a physical downlink control channel (PDCCH) in a first slot, first scheduling information 20_1 for a data channel, wherein the first slot is separated by at least one first period of multiple slots from next first scheduling information 20_1; and
- transmitting, in the PDCCH in at least one second slot, second scheduling information 20_2 for the data channel, wherein the at least one second slot is delayed with respect to the first slot by one or more slots and is received within the first period of multiple slots after the first slot,
- wherein the first scheduling information 20_1 in the first slot is associated with (e.g. points to) at least the second scheduling information 20_2; and wherein the second scheduling information 20_2 is related to at least one hybrid automatic request (HARQ) process for the data channel.

The base station 120 can be configured to control using control plane signaling (e.g. radio resource control signaling) sent from the base station 120 to the use 110 one or more of
- the at least one first period duration (the scheduling unit 40 duration);
- a content of the first scheduling information 20_1;
- a pointer in frequency and/or time, to at least the second scheduling information 20_2;
- a timing of the first slots 20_1 comprising first scheduling information 20_1;
- a number of second slots 20_2 comprising second scheduling information 20_2;
- a content of second scheduling information 20_2;
- a timing of second slots 20_2 comprising second scheduling information 20_2
- timing of HARQ replies 50_A, 50_B; 54_A;
- enabling early HARQ processes before reception of second scheduling information 20_2.

The user equipment 110 can be configured to respond to that control plane signaling e.g. RRC signaling, to enable remote control, at the user equipment 110 by the base station 120, of one or more of:
- the at least one first period duration (the scheduling unit 40 duration);
- a content of the first scheduling information 20_1;
- a pointer in frequency and/or time, to at least the second scheduling information 20_2;
- a timing of the first slots comprising first scheduling information 20_1;
- a number of second slots comprising second scheduling information 20_2;
- a content of second scheduling information 20_2;
- a timing of second slots comprising second scheduling information 20_2
- timing of HARQ replies;
- enabling early HARQ processes before reception of second scheduling information 20_2.

The control plane signaling can control a split of scheduling information between the first scheduling information 20_1 and the second scheduling information 20_2. For example, how many slots/sub-slots/TTIs are fully scheduled by the first scheduling information 20_1 and how many are dependent on the second scheduling information 20_2 as well.

The control plane signaling can control the timing patterns for uplink data transfer via PUCCH.

The control plane signaling can control the search space for the second scheduling information 20_2.

The control plane signaling can control a duration of the period.

In some but not necessarily all examples, the splitting of scheduling information to the first scheduling information 20_1 and second scheduling information 20_2 can be activated. The trigger for activation can, for example, be that the HARQ round trip delay (or some portion of it) has exceeded a threshold. The threshold can, for example be dependent upon the current subcarrier spacing used for the PDCCH 30. The threshold may indicate when contiguous scheduling of the available HARQ processes in the available slots is no longer possible. The threshold can therefore also be dependent upon the number of HARQ processes, if it is variable.

If the round trip time is defined as UE processing time+control channel duration+gNB processing time (including scheduling time), then activation can occur when the round trip time is greater than N_HARQ·N_PDCCH_periodicity (of first PDCCH monitored blindly). N_HARQ is the number of DL (or UL) shared channel HARQ processes. N_PDCCH_periodicity is the periodicity of first slots 20_1 (the period). In the definition of the round trip time for scheduling, the control channel duration is PUCCH duration in the case of PDSCH and PDCCH duration in the case of PUSCH. However, in practice these can be zero valued in TDD case (which is primary use case), by multiplexing the control channel with shared channel or by shortening the shared channel length within a slot so that there is time for Tx/Rx switching gap and the control channel. N_HARQ is, for example, equal to m*N_PDCCH_periodicity, where m is an integer.

Figure 5:
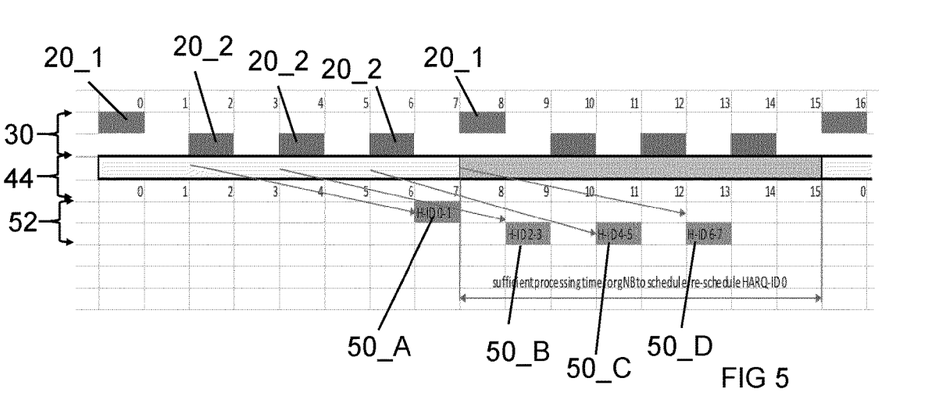
FIG. 5 shows another example of the subject matter described herein.

FIG. 5 illustrates another example of a scheduled data transfer via a downlink data channel 44 with HARQ. It is an example similar to FIG. 3.

The PDCCH 30 is used to transfer, from the base station 120 to the UE 110, first scheduling information 20_1 in a first slot (slot #0 & slot #8 in FIG. 5) and second scheduling information 20_2 in second slots (slots #2, 4, 6 & slots #10, 12, 14).

The first scheduling information 20_1 (slot #0) points to the second scheduling information 20_2 (slots #2, 4, 6).

The first scheduling information 20_1 (slot #8) points to the second scheduling information 20_2 (slots #10, 12, 14).

The first scheduling information 20_1 can be as described previously. The scheduling information can be split between the first and second scheduling information 20_2 as previously described. The scheduling information can, for example, comprise one or more of: resource allocation for the data channel (frequency domain resource allocation and/or time domain resource allocation), information for decode assistance, and HARQ parameters.

In this example, the first scheduling information 20_1 (slot #0) is configured to allocate two HARQ processes, for downlink data received in two initial slots (#0, 1). The HARQ reply 50_A is provided in PUCCH 52 at slot #7.

The second scheduling information 20_2 (slot #2) is configured to allocate two HARQ processes, for downlink data received or scheduled for receipt in the next two slots (#2, 3). The HARQ reply 50_B is provided in PUCCH 52 at slot #9.

The second scheduling information 20_2 (slot #4) is configured to allocate two HARQ processes, for downlink data received or scheduled for receipt in the next two slots (#4, 5). The HARQ reply 50_C is provided in PUCCH 52 at slot #11.

The second scheduling information 20_2 (slot #6) is configured to allocate two HARQ processes, for downlink data received or scheduled for receipt in the next two slots (#6, 7). The HARQ reply 50_D is provided in PUCCH 52 at slot #13.

As the HARQ replies are split, the base station can have more time to schedule/re-schedule an earlier HARQ reply that indicates failure of data transfer.

In this example, the base station 120 transmits, and the UE 110 receives, different data in different slots of the data channel (PDSCH) 44 during the one or more periods 40.

The UE 110 transmits, and the base station 120 receives separate HARQ replies for the different data. The channel 52 used for the separate HARQ replies is a physical uplink channel, in this example, the physical uplink control channel (PUCCH).

In this example, the first scheduling information 20_1 points to all the second scheduling information 20_2 (second slots) in the immediately following period (slots #0 to #8).

In this example, the first scheduling information 20_1 provides a sub-set of HARQ parameters only for a sub-set of HARQ processes.

In other examples, the first scheduling information 20_1 can provide all HARQ parameters only for a sub-set of HARQ processes.

In other examples, the first scheduling information 20_1 can provide a sub-set of HARQ parameters for all HARQ processes.

However, it does not provide all HARQ parameters for all HARQ processes because each second scheduling information 20_2 provides at least a sub-set of HARQ parameters for at least a sub-set of HARQ processes.

The second scheduling information 20_2 can provide a different sub-set of HARQ parameters for different HARQ processes.

For example, the first scheduling information 20_1 in in slot #0 can indicate presence of second scheduling information 20_2 in slots #2, 4, 6 and provide NDI only for the PDSCH 44 with process HARQ-ID #0 and #1.

The second scheduling information 20_2 in slot #2 provides: K1 (reply timing) and PUCCH resource with respect to end of slot 2 for the PDSCH 44 with HARQ-ID #0 and #1. The second scheduling information 20_2 in slot #2 provides NDI for PDSCH 44 with process HARQ-ID #2 and #3.

The second scheduling information 20_2 in slot #4 provides: K1 (reply timing) and PUCCH resource with respect to end of slot 4 for the PDSCH 44 with HARQ-ID #2 and #3. The second scheduling information 20_2 in slot #4 provides NDI for PDSCH 44 with process HARQ-ID #4 and #5.

The second scheduling information 20_2 in slot #6 provides: K1 (reply timing) and PUCCH resource with respect to end of slot 6 for the PDSCH 44 with HARQ-ID #4 and #5. The second scheduling information 20_2 in slot #6 provides NDI for PDSCH 44 with process HARQ-ID #5 and #6 and also provides: K1 (reply timing) and PUCCH resource with respect to end of slot 6 for the PDSCH 44 with HARQ-ID #6 and #7.

Figure 6:
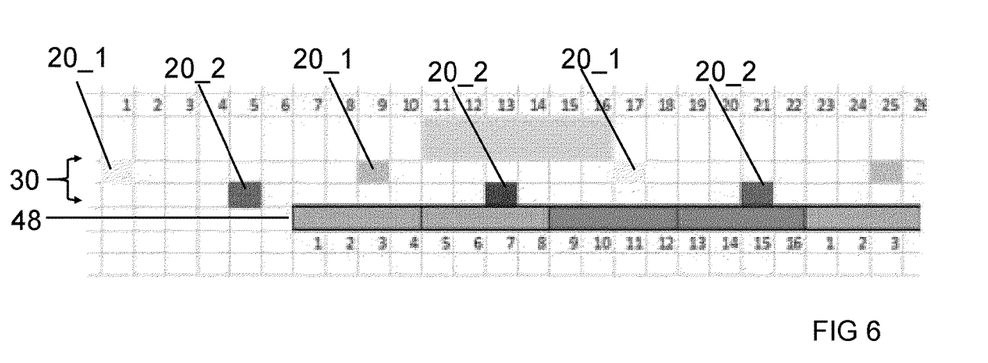
FIG. 6 shows another example of the subject matter described herein.

FIG. 6 illustrates another example of a scheduled data transfer via an uplink data channel 48 with HARQ (e.g. corresponding to FIG. 4).

The PDCCH 30 is used to transfer, from the base station 120 to the UE 110, first scheduling information 20_1 in a first slot 20_1 (slot #1, 9, 17, 25 in FIG. 6) and second scheduling information 20_2 in second slots 20_2 (slots #5, 13, 21 in FIG. 6).

The first scheduling information 20_1 (slot #1) points to the second scheduling information 20_2 (slots #5) in the immediately following period.

The first scheduling information 20_1 (slot #9) points to the second scheduling information 20_2 (slots #13) in the immediately following period.

The first scheduling information 20_1 (slot #17) points to the second scheduling information 20_2 (slots #21) in the immediately following period.

The first scheduling information 20_1 can be as described previously. The scheduling information can be split between the first and second scheduling information 20_2 as previously described. The scheduling information can, for example, comprise one or more of: resource allocation for the data channel (frequency domain resource allocation and/or time domain resource allocation), information for decode assistance, and HARQ parameters.

In this example, the first scheduling information 20_1 (slot #1) and the second scheduling information 20_2 (slot #5) are configured to allocate a HARQ process, for uplink data transmitted in slots #7-10 of channel 48. The HARQ reply (not illustrated) will be provided in PDCCH 30. At least some scheduling information e.g. NDI, MCS and HARQ-ID is provided by the second scheduling information 20_2.

The base station 120 has slots #11 to 16 for PUSCH and uplink scheduling.

In the examples illustrated, for example as shown in FIG. 5, for data downlink, the first scheduling information 20_1 can point to multiple occurrences of second scheduling information 20_2. The first scheduling information 20_1 provides one or more pointers.

In the examples illustrated, for example as shown in FIG. 6, for data uplink, the first scheduling information 20_1 points to one occurrence of second scheduling information 20_2. The first scheduling information 20_1 provides a single pointer.

The above described processes are scalable. As subcarrier spacing increases (and slot size decreases) the period increases (as measured in slots). The above described processes allow using second scheduling information 20_2 (and adjusting the number of second slots using second scheduling information 20_2 per period), so that different sub carrier spacings and different periods can be supported.

The size of the first scheduling information 20_1 can be kept relatively small (e.g. compared to the case where all the scheduling information is contained in a single PDCCH slot). The size of the first scheduling information 20_2 can be kept relatively small since part of the scheduling information (common for both the first and the second scheduling information) can be conveyed only via the first scheduling information 20_1.

Scheduling flexibility is maintained, by the association (e.g. pointing) from the first scheduling information 20_1 to the second scheduling information 20_2.

There is a reasonable user equipment blind detection burden because of the association (e.g. pointer) from the first scheduling information 20_1 to the second scheduling information 20_2. For example, UE may be able to perform N blind decodes per slot (N is a parameter e.g. 12). In the current approach, the first scheduling information may follow the budget of N blind decodes/slot. The second scheduling information may consume only one blind decodes (thus the total blink decoding budget would be e.g. N+1 or N+2 per first period, instead of N*2 or N*3).

Reasonable user equipment and base station processing times are supported with a reasonable number of HARQ processes e.g. maximum of 16 HARQ processes.

Only minor changes may be required to the base station and user equipment physical layer design. No changes to the HARQ processes may be needed.

The following paragraphs provide some further details of examples.

In different examples, different aspects of the HARQ processes can be controlled by different ones of the first scheduling information 20_1 and the second scheduling information 20_2.

According to one option, the first scheduling information 20_1 can trigger the HARQ reply. The first scheduling information 20_1 can indicate PUCCH timing via selecting of a predefined pattern (from plurality of patterns configured by RRC).

For example, the pattern can provide:
K1 value for each scheduled PDSCH. PUCCH timing is determined relative to each PDSCH; and
separate PUCCH resource indicator (PRI) for each PUCCH transmission, or single PRI is used for all PUCCH transmissions An example of a pattern corresponding to FIG. 6 is:

| PDSCH number: | #0 | #1 | #2 | #3 | #4 | #5 | #6 | #7 |
|---|---|---|---|---|---|---|---|---|
| K1 value: | 7 | 6 | 7 | 6 | 7 | 6 | 7 | 6 |
| PRI value: | 1 | 1 | 2 | 2 | 2 | 2 | 2 | 2 |

According to another option, the second scheduling information 20_2 can trigger the HARQ reply. HARQ feedback timing, codebook and PUCCH resource are determined by K1 and PUCCH resource indicator values contained on the second scheduling information 20_2 and K1 value is determined relative to last scheduled PDSCH by that second scheduling information 20_2. K1 values are configured by RRC. The first scheduling information 20_1 and the second scheduling information 20_2 can share a common configuration of K1 values, or K1 values may be configured separately for the first scheduling information 20_1 and the second scheduling information 20_2.

In the example of FIG. 5, the first scheduling information 20_1 does not trigger HARQ feedback, except for PDSCH slots that it schedules directly (if any). In FIG. 5, the first two PDSCH slots are reported in PUCCH triggered by first scheduling information 20_1. The other PDSCH slots are reported in additional (intermediate) PUCCH slots triggered by respective second scheduling information 20_2.

In an alternative example, the first scheduling information 20_1 triggers normal HARQ feedback covering HARQ feedback for all scheduled PDSCHs (i.e. repeating HARQ-ACK transmission for some of the PDSCHs). The HARQ feedback containing A/N for all scheduled PDSCHs triggered by the first scheduling information 20_1 is transmitted last. The additional triggered intermediate HARQ replies in PUCCH are transmitted earlier and provide early HARQ feedback.

HARQ feedback codebook (CB) determination for feedback triggered by second scheduling information 20_2 can use the legacy CB determination. To reduce Type 1 CB size, a reduced K1 set may be configured for second scheduling information 20_2 and used in the Type 1 CB determination.

Slots containing both first scheduling information 20_1 triggered HARQ feedback and second scheduling information 20_2 triggered HARQ feedback may need to include both downlink and uplink symbols. Sufficiently short PUCCH transmissions may need to be used.

The demodulation reference signal (DMRS) used for detecting second scheduling information 20_2 can be the same or different to the DMRS used for detecting the first scheduling information 20_1.

PDCCH DMRS is always used when detecting first scheduling information 20_1.

PDCCH (second scheduling information 20_2) can be demodulated based on PDSCH DMRS or PDCCH DMRS.

When PDCCH (second scheduling information 20_2) is demodulated based on PDSCH DMRS, then CCEs are grid aligned with PDSCH data.

A CCE is a control channel element. A CCE is a group of resources used to send PDCCH. PDCCH is transmitted using Resource Elements (RE) which belong to a Control Resource Set (CORESET). A single resource element group (REG) is 1 resource Block (RB) in the frequency domain and 1 symbol in the time domain i.e. 12 Resource elements. Aggregation level maps RE/REG to CCE When PDCCH (second scheduling information 20_2) is demodulated based on PDCCH DMRS (independent of PDSCH) then a predefined subset of CCEs of first scheduling information 20_1's PDCCH CORESET is used or the CCE grid is in a predefined location configured via RRC.

One option is therefore to demodulate PDCCH (second scheduling information 20_2) based on PDCCH DMRS using a defined subset of CCEs of first scheduling information 20_1's PDCCH CORESET. The subset can be defined by the pointer. This option can also work with PUSCH multi-transmission time interval (TTI) scheduling.

The legacy PDCCH processing chain can be used for second scheduling information 20_2 detection significantly lowering the blind detection burden and reducing power consumption.

Some properties of the second scheduling information 20_2 can be derived from the first scheduling information 20_1 and/or its associated CORESET. For example, such properties can include:
i) timing, i.e. location of CORESET and its starting symbol within a slot,
ii) CCEs carrying the second scheduling information 20_2 may be derived as a subset of CCEs (of CORESET) where first scheduling information 20_1 have been detected,
iii) RNTI, and/or
iv) Payload.

In some examples, the association/pointer of the first scheduling information 20_1 is explicitly indicated by content comprised in the first scheduling information 20_1.

A location of the second scheduling information 20_2 can be indicated via inclusion in the first scheduling information 20_1 of a predefined pattern (from a plurality of patterns configured by RRC) or a bitmap covering the number/group of slots that can be scheduled by the second scheduling information 20_2.

The presence of second scheduling information 20_2 in some slots can be indicated by a special value of the field (or fields) in first scheduling information 20_1 e.g. NDI (or NDI+RV combination) indicating that NDI signaling is postponed to second scheduling information 20_2 of corresponding period.

One occurrence of second scheduling information 20_2 can be associated with one or more other occurrences of second scheduling information 20_2 via the first scheduling information 20_1. For example, the first scheduling information 20_1 can schedule fully the first 4 PDSCH slots, and in 5th PDSCH slot there is second scheduling information 20_2 for PDSCH slots 5-8. Therefore, the second scheduling information 20_2 is associated with 4 PDSCH slots scheduled by first scheduling information 20_1.

CORESET is set of control resources and consist of N CCEs. Contiguous CCEs (1, 2, 4, 8 or 16) form a PDCCH candidate that can hold a PDCCH.

The user equipment can determine the start CCE of PDCCH.

For example, if the second scheduling information 20_2 is to be found in a predefined subset of CCEs of first scheduling information 20_1's CORESET, the base station can indicate a starting logical CCE in the CORESET where the second scheduling information 20_2 is located, separately for each UE. However, this may require further increase of master PDCCH payload. Another solution is to determine the starting CCE of the second scheduling information 20_2 implicitly.

In some but not necessarily all examples, the starting CCE is determined based on starting resource block (RB) and/or starting symbol of the PDSCH/PUSCH.

For example, the starting CCE for each UE's second scheduling information 20_2 is determined based on starting physical resource block (PRB) of PDSCH.

This is given by equation $$CCE_{start} = \text{floor}\left(\frac{PDSCH_{start}^{PRB}}{BWP_{size}^{PRB}} CORESET_{size}\right),$$

where $PDSCH_{start}^{PRB}$ is start RB of associated PDSCH $BWP_{sizw}^{PRB}$ is size in RBs of active BWP for associated PDSCH $CORESET_{size}$ is number of CCE in master CORESET An alternative is to use the subset of CCEs of the first scheduling information 20_1's CORESET where the first scheduling information 20_1 has been decoded. Using a sub-set would guarantee that the second scheduling information 20_2 of scheduled user equipments will not collide if first scheduling information 20_1 did not collide. Also, the second scheduling information 20_2 would typically be of a smaller payload than the first scheduling information 20_1, and thus may require less CCEs than the first scheduling information 20_1 to provide the same amount of coverage reliability.

Figure 7:
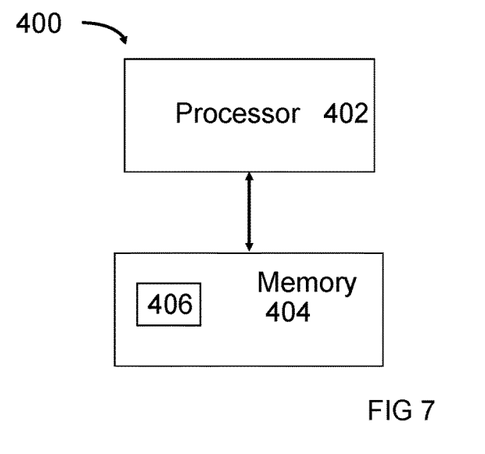
FIG. 7 shows another example of the subject matter described herein.

FIG. 7 illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 7, the controller 400 may be implemented using instructions that enable hardware functionality, for example, by using executable instructions of a computer program 406 in a general-purpose or special-purpose processor 402 that may be stored on a computer readable storage medium (disk, memory, and/or the like) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the user equipment 110 or base station 120, when loaded into the processor 402. The computer program instructions, of the computer program 406, provide the logic and routines that enables the apparatus to perform the methods illustrated in FIGS. 2 to 6. The processor 402 by reading the memory 404 is able to load and execute the computer program 406.

The apparatus (e.g. user equipment 110) can comprise:
at least one processor 402; and
at least one memory 404 including computer program code
the at least one memory 404 and the computer program code configured to, with the at least one processor 402, cause the apparatus at least to perform:
receiving, in a physical downlink control channel (PDCCH) in a first slot, first scheduling information 20_1 for a data channel, wherein the first slot is separated by at least one first period of multiple slots from next first scheduling information 20_1;
receiving, in the PDCCH in at least one second slot, second scheduling information 20_2 for the data channel, wherein the at least one second slot is delayed with respect to the first slot by one or more slots and is received within the first period of multiple slots after the first slot,
wherein the first scheduling information 20_1 in the first slot points to at least the second scheduling information 20_2; and
wherein the second scheduling information 20_2 is related to at least one hybrid automatic request (HARQ) process for the data channel The system (e.g. base station 120) can comprise:
at least one processor 402; and
at least one memory 404 including computer program code
the at least one memory 404 and the computer program code configured to, with the
at least one processor 402, cause the system (base station 120) at least to perform:
transmitting, in a physical downlink control channel (PDCCH) in a first slot, first scheduling information 20_1 for a data channel, wherein the first slot is separated by at least one first period of multiple slots from next first scheduling information 20_1; and
transmitting, in the PDCCH in at least one second slot, second scheduling information 20_2 for the data channel, wherein the at least one second slot is delayed with respect to the first slot by one or more slots and is received within the first period of multiple slots after the first slot,
wherein the first scheduling information 20_1 in the first slot points to at least the second scheduling information 20_2; and wherein the second scheduling information 20_2 is related to at least one hybrid automatic request (HARQ) process for the data channel.

Figure 8:
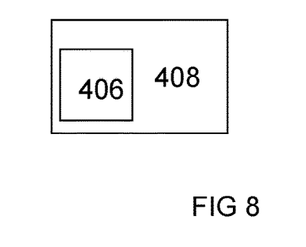
FIG. 8 shows another example of the subject matter described herein.

As illustrated in FIG. 8, the computer program 406 may arrive at the user equipment 110 or base station 120 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The user equipment 110 or base station 120 may propagate or transmit the computer program 406 as a computer data signal.

The computer program 406 can, when run on a computer comprised in user equipment, enables the user equipment to perform:
receiving, in a physical downlink control channel (PDCCH) in a first slot, first scheduling information 20_1 for a data channel, wherein the first slot is separated by at least one first period of multiple slots from next first scheduling information 20_1;
receiving, in the PDCCH in at least one second slot, second scheduling information 20_2 for the data channel, wherein the at least one second slot is delayed with respect to the first slot by one or more slots and is received within the first period of multiple slots after the first slot, wherein the first scheduling information 20_1 in the first slot points to at least the second scheduling information 20_2; and wherein the second scheduling information 20_2 is related to at least one hybrid automatic request (HARQ) process for the data channel.

A different computer program 406 can, when run on a computer comprised in a base station 120, enable the base station 120 to perform:

transmitting, in a physical downlink control channel (PDCCH) in a first slot, first scheduling information 20_1 for a data channel, wherein the first slot is separated by at least one first period of multiple slots from next first scheduling information 20_1; and transmitting, in the PDCCH in at least one second slot, second scheduling information 20_2 for the data channel, wherein the at least one second slot is delayed with respect to the first slot by one or more slots and is received within the first period of multiple slots after the first slot, wherein the first scheduling information 20_1 in the first slot points to at least the second scheduling information 20_2; and wherein the second scheduling information 20_2 is related to at least one hybrid automatic request (HARQ) process for the data channel.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 to 6 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   at least one processor; and
   at least one memory including computer program code, the at least one memory and the computer program code configured to, with the at least one processor, cause the apparatus at least to perform:
   receiving, in a physical downlink control channel (PDCCH) in a first slot, first scheduling information for a data channel, wherein the first slot is separated by at least one first period of multiple slots from next first scheduling information; and
   receiving, in the PDCCH in at least one second slot, second scheduling information for the data channel, wherein the at least one second slot is delayed with respect to the first slot by one or more slots and is received within the first period of multiple slots after the first slot,
   wherein the first scheduling information in the first slot points to at least the second scheduling information,
   wherein the first scheduling information is related to at least one hybrid automatic request (HARQ) process for the data channel, and
   wherein the second scheduling information is related to at least one HARQ process for the data channel.

2. The apparatus as claimed in claim 1, wherein at least one of the first scheduling information and the second scheduling information is configured to enable at least two HARQ processes for the data channel, wherein the two HARQ processes are non-overlapping in a time domain.

3. The apparatus as claimed in claim 1, wherein the first scheduling information and the second scheduling information in combination enable:
   receiving first data in a slot of the data channel during the at least one first period;
   receiving second data in a different slot of the data channel during the at least one first period; and
   transmitting a HARQ reply for the first data separately to transmitting a HARQ reply for the second data.

4. The apparatus as claimed in claim 1, wherein the first scheduling information and the second scheduling information in combination enable:
   transmitting first data in a slot of the data channel during the at least one first period; and
   transmitting second data in a different slot of the data channel during the at least one first period.

5. The apparatus as claimed in claim 1, wherein the first scheduling information is configured to allocate one or more early HARQ processes before reception of second scheduling information and wherein the second scheduling information is configured to assist allocation of one or more later HARQ processes at or after reception of the second scheduling information.

6. The apparatus as claimed in claim 1, wherein the reception in the PDCCH is with a subcarrier spacing of 480 kHz, 960 kHz, 1920 kHz or greater.

7. The apparatus as claimed in claim 1, wherein the at least one memory and the computer program code are configured to, with the at least one processor, cause the apparatus at least to, in response to received control signaling, enable remote control of one or more of:
   the at least one first period duration;
   a content of the first scheduling information;
   a pointer in frequency and/or time, to at least the second scheduling information;
   a timing of the first slots comprising first scheduling information;
   a number of second slots, within the first period, comprising second scheduling information;
   a content of second scheduling information;
   a timing of second slots comprising second scheduling information
   timing of HARQ replies; or
   enabling early HARQ processes before reception of second scheduling information.

8. The apparatus as claimed in claim 1, wherein the at least one memory and the computer program code are configured to, with the at least one processor, cause the apparatus to be configured as user equipment or mobile equipment of a radio access network.

9. A system, comprising:
at least one processor; and
at least one memory including computer program code, the at least one memory and the computer program code configured to, with the at least one processor, cause the system at least to perform:
transmitting, in a physical downlink control channel (PDCCH) in a first slot, first scheduling information for a data channel, wherein the first slot is separated by at least one first period of multiple slots from next first scheduling information; and
transmitting, in the PDCCH in at least one second slot, second scheduling information for the data channel, wherein the at least one second slot is delayed with respect to the first slot by one or more slots and is received within the first period of multiple slots after the first slot,
wherein the first scheduling information in the first slot points to at least the second scheduling information,
wherein the first scheduling information is related to at least one hybrid automatic request (HARQ) process for the data channel, and
wherein the second scheduling information is related to at least one HARQ process for the data channel.

10. The system as claimed in claim 9, wherein the at least one memory and the computer program code are configured to, with the at least one processor, cause the system at least to control one or more of:
the at least one first period duration;
a content of the first scheduling information;
a pointer in frequency and/or time, to at least the second scheduling information;
a timing of the first slots comprising first scheduling information;
a number of second slots, within the first period, comprising second scheduling information;
a content of second scheduling information;
a timing of second slots comprising second scheduling information
timing of HARQ replies; or
enabling early HARQ processes before reception of second scheduling information.

11. The system as claimed in claim 9, wherein the second scheduling information is based on information that was not available at the time of transmitting the first scheduling information.

12. The system as claimed in claim 9, wherein the at least one memory and the computer program code are configured to, with the at least one processor, cause the system to be configured as a base station for a radio access network.

13. A method, comprising:
receiving, at an apparatus, in a physical downlink control channel (PDCCH) in a first slot, first scheduling information for a data channel, wherein the first slot is separated by at least one first period of multiple slots from next first scheduling information; and
receiving, at the apparatus, in the PDCCH in at least one second slot, second scheduling information for the data channel, wherein the at least one second slot is delayed with respect to the first slot by one or more slots and is received within the first period of multiple slots after the first slot,
wherein the first scheduling information in the first slot points to at least the second scheduling information,
wherein the first scheduling information is related to at least one hybrid automatic request (HARQ) process for the data channel, and
wherein the second scheduling information is related to at least one HARQ process for the data channel.

14. The method as claimed in claim 13, wherein at least one of the first scheduling information and the second scheduling information is configured to enable at least two HARQ processes for the data channel, wherein the two HARQ processes are non-overlapping in the time domain.

15. The method as claimed in claim 13, wherein the first scheduling information and the second scheduling information in combination enable:
receiving first data in a slot of the data channel during the at least one first period;
receiving second data in a different slot of the data channel during the at least one first period; and
transmitting a HARQ reply for the first data separately to transmitting a HARQ reply for the second data.

16. The method as claimed in claim 13, wherein the first scheduling information and the second scheduling information in combination enable:
transmitting first data in a slot of the data channel during the at least one first period; and
transmitting second data in a different slot of the data channel during the at least one first period.

17. The method as claimed in claim 13, wherein the first scheduling information is configured to allocate one or more early HARQ processes before reception of second scheduling information and wherein the second scheduling information is configured to assist allocation of one or more later HARQ processes at or after reception of the second scheduling information.

18. The method as claimed in claim 13, wherein the reception in the PDCCH is with a subcarrier spacing of 480 kHz, 960 kHz, 1920 kHz or greater.

19. The method as claimed in claim 13, in response to received control signaling, enabling remote control of one or more of:
the at least one first period duration;
a content of the first scheduling information;
a pointer in frequency and/or time, to at least the second scheduling information;
a timing of the first slots comprising first scheduling information;
a number of second slots, within the first period, comprising second scheduling information;
a content of second scheduling information;
a timing of second slots comprising second scheduling information
timing of HARQ replies; or
enabling early HARQ processes before reception of second scheduling information.

20. The method as claimed in claim 13, wherein the apparatus is a user equipment or mobile equipment of a radio access network.

* * * * *